J. A. CRAIG.
FEED MIXER.
APPLICATION FILED APR. 30, 1912.

1,061,987.

Patented May 20, 1913.

Witnesses
H. Davis
C. Patenaude

Inventor
J. A. Craig
by C. J. Vettenstenhaugh
Attorney

COLUMBIA PLANOGRAPH CO., WASHINGTON, D. C.

UNITED STATES PATENT OFFICE.

JAMES ARCHIBALD CRAIG, OF TORONTO, ONTARIO, CANADA, ASSIGNOR OF ONE-HALF TO JULES MARIUS WOGAN, OF NEW ORLEANS, LOUISIANA.

FEED-MIXER.

1,061,987. Specification of Letters Patent. Patented May 20, 1913.

Application filed April 30, 1912. Serial No. 694,140.

*To all whom it may concern:*

Be it known that I, JAMES ARCHIBALD CRAIG, citizen of the United States of America, and resident of 371 Huron street, in the city of Toronto, in the Province of Ontario, in the Dominion of Canada, have invented certain new and useful Improvements in Feed-Mixers; and I do hereby declare that the following is a full, clear, and exact description of the same.

The invention relates to improvements in feed mixers, as described in the present specification and illustrated in the accompanying drawing that form part of the same.

The invention consists essentially in the novel arrangement and construction of parts whereby the feed is directed on to a skeleton rotary member with blades adapted to thoroughly mix it.

The objects of the invention are to devise a mixer which will effectively mix the food articles for animal food in a comparatively short period of time, to avoid the accumulation in any one part of the casing of the ingredients to the mixture and generally to provide a simple cheap and durable machine.

Figure 1:
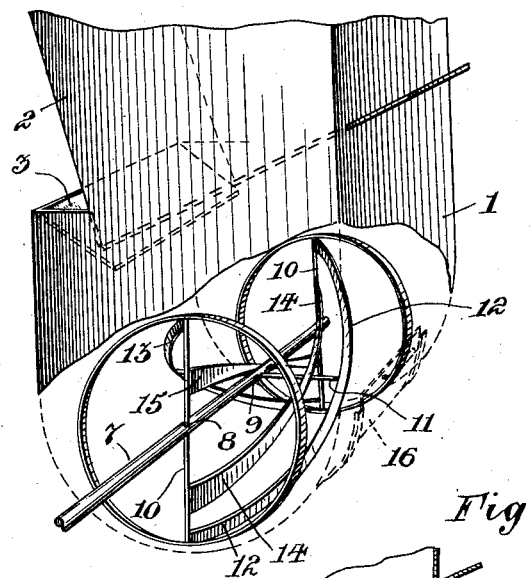
Figure 2:
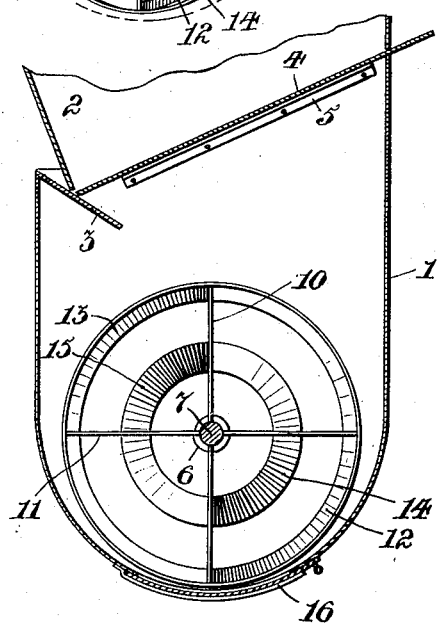

In the drawings Figure 1 is a perspective view showing the casing broken away to disclose the rotor. Fig. 2 is a vertical sectional view of the machine.

Referring to the drawings 1 is the casing of substantially semicylindrical shape and having at the upper end thereof the hopper 2.

3 is a deflecting plate or board extending inwardly from the extreme upper end at one side of the casing 1 and forming an inclined way for the food ingredients, in order to direct them in feeding toward the longitudinal center of said casing, the lower inclined side of the hopper terminating intermediately on the upper side of the deflecting plate 3.

4 is the sliding bottom or gate of the hopper supported by the brackets 5 or in any suitable way, said sliding bottom extending through the hopper casing and terminating at its inner end at the bottom of the lower side of the hopper on the deflecting plate 3, therefore by drawing out the sliding bottom 4, the food ingredients are directed over toward the center of the casing by means of the said deflecting plate and no matter how far the said sliding bottom is drawn out the food will still drop centrally.

6 are bearings in the end walls of the casing 1 in the semi cylindrical portion thereof.

7 is a shaft journaled in the bearings 6 and extending from beyond at one end of said casing, said shaft having the rod holes 8 therethrough adjacent to the end walls of the casing 1 and the rod hole 9 therethrough at right angles to the said rod holes 8 midway therebetween.

10 are rods inserted through the holes 8 and rigidly secured in said shaft, one section of each of said rods being adapted to reach almost to the bottom of the casing and in rotation describe a circle increasing in distance from the casing from the bottom up.

11 is a rod inserted through the rod hole 9 and rigidly secured in the shaft and of the same length as the rods 10.

12 is a mixing blade rigidly secured to a rod 10 and describing the half curve of a spiral and secured at the other end to the extremity of the other rod 10 on the opposite side of the shaft and in right hand arrangement.

13 is a blade in left hand arrangement and of half spiral curve formation and secured to the other ends of the rods 10 respectively said blades 12 and 13 intermediate of the length thereof, being supported by the rod 11.

14 is a right hand blade secured to one of the rods 10 between the shaft and the blade 12 and extending in a half spiral curve and secured to the opposite section of the other rod 10 between the shaft and the blade 12.

15 is a left hand blade secured to a rod 10 between the blade 13 and the shaft and describing a half spiral curve and secured to a section of the other rod 10 between the blade 13 and the shaft.

16 is a sliding door closing the discharge opening at the bottom of the casing 1.

In the operation of this invention the hopper is filled or partially filled with food ingredients together or separately as desired. The sliding bottom or gate of the hopper is then pulled out and the said ingredients are deflected by the plate 3 or fall off the inner end of the sliding bottom and in either case the ingredients drop on to the rotor which is turning at considerable speed. The blades of the rotor engage the ingredients and keep the contents of the casing 1 in a constant commotion and in doing this the said ingredients are not driven to either end of the casing, mainly because of the half spiral formation of the blades and the right and left hand formations. The blades are quite clear of the casing and it is only at the bottom end, that they are really adjacent, this has the effect of thoroughly sweeping the discharge through the opening provided therefor and by reference to the dotted lines in the drawings, showing the sweep of the rods and blades, it will be seen that there is no possibility of clogging occurring between the sides of the casing and the said rotor, furthermore there is absolutely no propelling effect as the half spirals churn the ingredients into a thorough mixture. This half spiral arrangement, if it can be so called, is certainly one of the most salient features of this invention, and though I have used and patented a very good machine with the complete spiral arrangement it still has to some extent the propelling properties and in this machine they seem to be entirely missing and if there is the slightest tendency toward that it is taken care of by the right and left hand arrangements of blades. It may also be pointed out that in the deflecting board or plate the thorough efficiency of the machine is assured, because once the rotor has caught the ingredients the movement is too active to let the stuff accumulate with the result that the mixture is produced in a very short time.

It has been found in some of these machines that where hay is one of the ingredients it is very difficult to handle it with any satisfaction, but in the present machine there is no trouble whatsoever whereas in my former invention and patent, the operation was not quite so good.

What I claim is:—

1. In a feed mixer, a casing, a rotor journaled in the end walls of said casing, a longitudinal plate or board extending downwardly and inwardly from the upper edge of said casing and deflecting the foodstuffs to the longitudinal center of the rotor, and a hopper having a sloping wall terminating intermediate of the depth of said deflecting plate and an inclined sliding bottom in its closed position extending to said deflecting plate and sloping wall.

2. In a feed mixer, a casing of substantially semi-cylindrical form at the lower end thereof and having a hopper top and shaft bearings in the end walls thereof and a rotor having its shaft journaled in said bearings and radial rods projecting therefrom and rigidly secured thereto adjacent to the end walls of said casing, a radial rod midway between the aforesaid rods and extending through the shaft and rigidly secured thereto and blades each describing a semi-spiral curve from one rod through and to the others and supported by said rods.

3. In a feed mixer, a casing having bearings in the end walls thereof, and a rotor having its shaft journaled in said bearings, rods secured to said shaft adjacent to the end walls of the casing, a rod at right angles secured to the shaft midway between the other rods and blades each describing a semi-spiral curve from the end of one of said rods to the end of another rod at the opposite side of the shaft and intermediately supported by the mid way rod, a similarly arranged and of semi-spiral formation and secured to the other ends of said rods and supported by the other end of the midway rod, intermediate blades between the said blades and the shaft and following similarly in semi-spiral curves.

Signed at Cincinnati this 18th day of March, 1912.

JAMES ARCHIBALD CRAIG.

Witnesses:
NORWOOD J. UTTER,
DORA REHBACH.

---

Copies of this patent may be obtained for five cents each, by addressing the "Commissioner of Patents, Washington, D. C."